(12) United States Patent
Nixon et al.

(10) Patent No.: US 9,193,037 B2
(45) Date of Patent: Nov. 24, 2015

(54) PREPARATION OF NANOCRYSTALLINE DIAMOND COATED DIAMOND PARTICLES AND APPLICATIONS THEREOF

(71) Applicant: National Oilwell DHT, L.P., Conroe, TX (US)

(72) Inventors: Michael S. Nixon, The Woodlands, TX (US); Guodong Zhan, Spring, TX (US); Michael D. Hughes, Conroe, TX (US); Anil Kumar, Conroe, TX (US)

(73) Assignee: NATIONAL OILWELL DHT, L.P., Conroe, TX (US)

( * ) Notice: Subject to any disclaimer, the term of this patent is extended or adjusted under 35 U.S.C. 154(b) by 164 days.

(21) Appl. No.: 13/742,451

(22) Filed: Jan. 16, 2013

(65) Prior Publication Data

US 2013/0180181 A1    Jul. 18, 2013

Related U.S. Application Data

(60) Provisional application No. 61/587,043, filed on Jan. 16, 2012.

(51) Int. Cl.
*B24D 3/00* (2006.01)
*B24D 3/02* (2006.01)
(Continued)

(52) U.S. Cl.
CPC . *B24D 3/04* (2013.01); *B82Y 30/00* (2013.01); *C04B 35/52* (2013.01); *C04B 35/624* (2013.01); *C04B 35/6263* (2013.01); *C04B 35/6264* (2013.01); *C04B 35/62655* (2013.01); *C04B 35/62802* (2013.01); *C04B 35/62839* (2013.01); *C04B 35/62886* (2013.01); *C04B 35/62892* (2013.01); *C22C 26/00* (2013.01); *C04B 2235/402* (2013.01); *C04B 2235/404* (2013.01); *C04B 2235/405* (2013.01); *C04B 2235/42* (2013.01); *C04B 2235/421* (2013.01);
(Continued)

(58) Field of Classification Search
USPC ............................................ 51/309, 293, 307
See application file for complete search history.

(56) References Cited

U.S. PATENT DOCUMENTS 5,690,706 A * 11/1997 Sigalas et al. ................... 51/307
5,954,147 A *  9/1999 Overstreet et al. ............ 175/374
(Continued)

FOREIGN PATENT DOCUMENTS

WO          00/38864 A1     7/2000

OTHER PUBLICATIONS

Bergstrom, Lennart, "Colloidal Processing of Ceramics," Handbook of Applied Surface and Colloid Chemistry, Chapter 9, Surface Chemistry in Important Technologies, Institute for Surface Chemistry, Stockholm, Sweden, pp. 201-218 (2001) (18 p.).
(Continued)

*Primary Examiner* — James McDonough
(74) *Attorney, Agent, or Firm* — Conley Rose, P.C.

(57) ABSTRACT

A method of making a polycrystalline diamond cutter element includes forming a blend, comprising a first particle size of polycrystalline diamond particles and a second particle size of polycrystalline diamond particles; forming a suspension of nanocrystalline diamond particles suspended in a solvent; and mixing the blend into the suspension to form a polycrystalline diamond mixture comprising nanocrystalline diamond coated polycrystalline diamond particles. The mixture is sintered with a substrate at high temperature and high pressure to form the polycrystalline diamond cutter element.

9 Claims, 10 Drawing Sheets

(51) Int. Cl.
*B24D 11/00* (2006.01)
*B24D 18/00* (2006.01)
*C09K 3/14* (2006.01)
*B24D 3/04* (2006.01)
*C04B 35/52* (2006.01)
*C04B 35/624* (2006.01)
*C04B 35/626* (2006.01)
*C04B 35/628* (2006.01)
*C22C 26/00* (2006.01)
*B82Y 30/00* (2011.01)

(52) U.S. Cl.
CPC ... *C04B2235/427* (2013.01); *C04B 2235/5436* (2013.01); *C04B 2235/5454* (2013.01); *C04B 2235/5472* (2013.01)

(56) References Cited

U.S. PATENT DOCUMENTS

| | | | |
|---|---|---|---|
| 7,516,804 B2 * | 4/2009 | Vail | 175/434 |
| 7,806,206 B1 | 10/2010 | Miess | |
| 7,841,428 B2 | 11/2010 | Bertagnolli | |
| 7,842,111 B1 | 11/2010 | Sani | |
| 7,947,329 B2 | 5/2011 | Sumant et al. | |
| 7,972,397 B2 | 7/2011 | Vail | |
| 2005/0019114 A1 | 1/2005 | Sung | |
| 2007/0054101 A1 | 3/2007 | Sigalas et al. | |
| 2009/0152015 A1 * | 6/2009 | Sani et al. | 175/420.2 |
| 2011/0252711 A1 | 10/2011 | Chakraborty et al. | |
| 2012/0034464 A1 * | 2/2012 | Chakraborty et al. | 428/402 |

OTHER PUBLICATIONS

Zeta Potential: An Introduction in 30 Minutes, Zetasizer Nano Series Technical Note, Malvern Instruments, United Kingdom, Nov. 12, 2010 (6 p.).

Wan, Chuanyun, et al., "Sub-Micrometer LiMn2O4 Prepared by a Sol-Gel, Spray-Drying Method," Department of Chemistry, Fudan University, Shanghai, China, Mar. 2, 2010 (1 p.).

Sol-Gel Chemistry and Engineering Background, Introduction to Hybrid Ogranic-Inorganic Materials, Etienne Duguet, University of Bordeaux, Jan. 22, 2007 (22 p.).

Sol-Gel Methods (2002) (13 p.).

PCT/US2013/021630 International Search Report and Written Opinion Dated Apr. 5, 2013 (11 p.).

* cited by examiner

PREPARATION OF NANOCRYSTALLINE DIAMOND COATED DIAMOND PARTICLES AND APPLICATIONS THEREOF

CROSS-REFERENCE TO RELATED APPLICATIONS

This application claims benefit of U.S. provisional patent application Ser. No. 61/587,043 filed Jan. 16, 2012, and entitled "Preparation of Nanocrystalline Diamond Coated Diamond Particles and Applications Thereof," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to earth-boring drill bits used to drill a borehole for the ultimate recovery of oil, gas, or minerals. More particularly, the invention relates to diamond coated cutter elements for drill bits and methods for making such cutter elements. Still more particularly, the invention relates to cutter elements comprised of nanocrystalline diamond coated micron or sub-micron diamond particles that promote sintering by enhancing solution and re-precipitation to form a greater number of diamond-to-diamond bonds per unit area.

2. Background of the Invention

The cost of drilling a borehole for recovery of hydrocarbons is very high, and is proportional to the length of time it takes to drill to the desired depth and location. The time required to drill the well, in turn, is greatly affected by the number of times the drill bit must be changed before reaching the targeted formation. This is the case because each time the bit is changed, the entire string of drill pipe, which may be miles long, must be retrieved from the borehole, section by section. Once the drill string has been retrieved and the new bit installed, the bit must be lowered to the bottom of the borehole on the drill string, which again must be constructed section by section. As is thus obvious, this process, known as a "trip" of the drill string, requires considerable time, effort and expense. Accordingly, it is desirable to employ drill bits which will drill faster and longer, and which are usable over a wider range of formation hardness.

An earth-boring drill bit is typically mounted on the lower end of a drill string and is rotated by rotating the drill string at the surface or by actuation of downhole motors or turbines, or by both methods. With weight applied to the drill string, the rotating drill bit engages the earthen formation and proceeds to form a borehole along a predetermined path toward a target zone. The borehole thus created will have a diameter generally equal to the diameter or "gage" of the drill bit. The length of time that such a drill bit may be employed before it must be changed depends upon a variety of factors. These factors include the bit's rate of penetration ("ROP"), as well as its durability or ability to maintain a high or acceptable ROP.

Many different types of drill bits and cutting structures for bits have been developed. Two predominant types of drill bits are roller cone bits and fixed cutter bits, also known as rotary drag bits. A common fixed cutter bit has a plurality of blades angularly spaced about the bit face. The blades generally project radially outward along the bit body and form flow channels therebetween. Cutter elements are typically mounted on the blades. Durability of a drill is in part dependent upon the cutter elements' abrasion resistance, toughness and ability to resist thermal degradation.

The cutter elements disposed on a fixed cutter bit are typically formed of extremely hard materials and include a layer of polycrystalline diamond ("PD") material. In the typical fixed cutter bit, each cutter element comprises an elongate and generally cylindrical support member which is received and secured in a pocket formed in the surface of one of the several blades. In addition, each cutter element typically has a hard cutting layer of polycrystalline diamond or other superabrasive material such as cubic boron nitride, thermally stable diamond, chemically modified or doped diamond, polycrystalline cubic boron nitride, or ultra-hard tungsten carbide (meaning a tungsten carbide material having a wear-resistance that is greater than the wear-resistance of the material forming the substrate) as well as mixtures or combinations of these materials. The cutting layer is exposed on one end of its support member, which is typically formed of tungsten carbide. For convenience, as used herein, reference to "PDC bit" or "PDC cutter element" refers to a fixed cutter bit or cutting element employing a hard cutting layer that contains polycrystalline diamond (PDC refers to Polycrystalline Diamond Compact). The hard cutting layer is also commonly referred to as a diamond layer or table.

The manufacture of polycrystalline diamond may use high pressure and high temperature. Initially, pressure is increased causing the diamond crystals to be pushed against each other with increasing force. These particles move relative to each other and often fragment, increasing the powder apparent density. A coarse powder displays a higher degree of crushing than a finer one, as the average number of contact points per unit volume is much higher for fine powders, and therefore fine powders display a lower contact stress and lower probability for fragmentation.

Secondly, during manufacturing, when the compacted powder is under full pressure, the temperature is raised. The diamond powder is typically packed against a WC—Co substrate, often the origin of the catalyst metal (Co) that induces sintering. In other instances, the catalyst metal may be directly mixed with the diamond powder prior to sintering. When the catalyst metal (e.g., cobalt) reaches its melting point, it is forced into the open porosities or (interstities) left within the layer of compacted powder. Sintering takes place through carbon dissolution and precipitation and reduction of internal energy, whereby the cobalt acts as a catalyst to facilitate the intergrowth process between the diamond particles or grains, which results in bonds between adjacent diamond grains, and formation of grain boundaries.

Densification is determined by the pressure and by the contact area relative to the cross-sectional area of the particles. The reaction speed is proportional to the temperature and to the average effective pressure, which is the actual contact pressure between particles. The sintering process is therefore faster if both the contact pressure and the temperature are increased. Smaller grain size and better packing result in lower contact pressure; therefore sintering PDC of very small particle size may utilize higher pressures and temperatures.

Typically, the smaller the size of the diamond crystals sintered together, the higher the wear abrasion resistance, but the lower the impact strength or toughness of the resulting PDC. With larger diamond particle sizes, a lower abrasion resistance is observed, but an increased toughness is achieved. Diamond compacts have limited heat resistance and thus experience high thermal wear. At atmospheric pressure, a diamond's surface turns to graphite at about 900° C. In a vacuum or in inert gas, diamond does not graphitize easily, even at about 1,400° C. However during use, conventional PDC cutters experience a decline in cutting performance around 750° C., a temperature that the cutting edge can easily reach due to frictional heating that occurs in hard, abrasive rock.

Flash temperatures which are extremely high localized temperatures at the microscopic level, can be much higher, exceeding the melting temperature of cobalt (1,495° C.). The presence of cobalt is believed to be the reason that PDC converts to graphite at a lower temperature than simple diamond.

When temperatures increase, graphitization of the diamond in the presence of cobalt becomes a dominant effect. Diamond wear is then due to an allotropic transformation into graphite or amorphous carbon under the influence of localized frictional heating. This transformation is accelerated in the presence of cobalt through a combination of mechanical and chemical effects. For example, the shear resistance of the cobalt drops rapidly, and the grains are not strongly held, leading to additional damage to the surface. It is also known that the real area of contact depends on the velocity with which plastic strains are propagated in the metal binder. The shearing occurs so rapidly that full plastic yielding under the normal load is not possible.

In addition, there is a significant difference between the thermal expansion coefficients of cobalt and diamond. During heating, cobalt expands at a higher rate than diamond. The amount of thermal stress in the diamond table increases, and the structure breaks down. The cobalt between the diamond crystals expands and breaks the diamond-to-diamond bonds, allowing for chipping and cracking of the diamond grains from the PD table.

PDC cutters can be categorized by their abrasion resistance, impact resistance and thermal stability, and it is difficult to achieve all three properties maximized in one cutter variant. In general, a cutter that is highly abrasion resistant is characterized by fine diamond particle/grain size, and a cutter that is highly impact resistant is characterized by a coarse particle/grain size.

Accordingly, there remains a need in the art for a fixed cutter bit with a cutting structure capable of enhancing bit ROP, and bit durability. Such cutting structures would be particularly well-received if they included PD material with enhanced bonding between diamond grains to provide improved resistance to mechanical failure and thermal properties. As such, embodiments disclosed herein address the requirement for improved thermal stability in PDC cutting elements, and further embodiments provide PDC cutting elements with characteristics to impart high abrasive resistance and high impact strength as compared to certain conventional cutters known in the art.

BRIEF SUMMARY OF THE DISCLOSURE

In an embodiment, a method for making a cutter element for a drill bit, the method comprising: forming a suspension comprising nanocrystalline diamond particles and a solvent; forming a blend comprising a first plurality of polycrystalline diamond particles and a second plurality of polycrystalline diamond particles, wherein each of the first plurality of polycrystalline diamond particles has a size that is greater than a size of each of the second plurality of polycrystalline diamond particles and mixing the blend and the suspension to form a mixture, wherein the mixture comprises less than 5 wt. % of the nanocrystalline diamond particles. The embodiment further comprising: spray drying the mixture to form a dry mixture, wherein the dry mixture comprises a plurality of nanocrystalline diamond coated polycrystalline diamond particles (NDCPD), wherein the plurality of nanocrystalline diamond particles are homogenously distributed around each of the plurality of polycrystalline diamond particles; and sintering the dry mixture to form the cutter element.

In an alternate embodiment, a method of making a cutter element for a drill bit, the method comprising: forming a suspension comprising a plurality of nanocrystalline diamond particles and a solvent, wherein the solvent is a polar liquid, and wherein each of the plurality of nanocrystalline diamond particles has a size of 1 nm-10 nm and disposing a plurality of polycrystalline diamond particles in the suspension to form a mixture, wherein a plurality of the plurality of nanocrystalline diamond particles are homogenously distributed about each of the plurality of polycrystalline diamond particles in the mixture, and wherein the plurality of polycrystalline diamond particles are distributed homogenously throughout the mixture, and wherein each of the plurality of polycrystalline diamond particles has a size of 15 μm-50 μm; wherein the zeta potential of at least one of the suspension and the mixture is from ±30 to ±100 mV. The embodiment further comprising drying the mixture using a solgel process; forming a dried mixture after drying the mixture, wherein the dried mixture comprises the plurality of nanocrystalline diamond particles homogenously distributed about each of the plurality of polycrystalline diamond particles, and wherein the plurality of polycrystalline diamond particles are distributed homogenously throughout the dried mixture; and sintering the dry mixture to form the cutter element.

In an alternate embodiment, a method of making a cutter element for a drill bit, the method comprising: forming a suspension comprising a plurality of nanocrystalline diamond particles and a solvent, wherein the solvent is a polar liquid; disposing a plurality of polycrystalline diamond particles in the suspension to form a mixture, wherein a plurality of the plurality of nanocrystalline diamond particles are homogenously distributed about each of the plurality of polycrystalline diamond particles in the mixture, and wherein the plurality of polycrystalline diamond particles are distributed homogenously throughout the mixture; and wherein the zeta potential of at least one of the suspension and the mixture is from ±30 to ±100 mV. The embodiment further comprising: drying the mixture using one of a spray-drying or a solgel process, wherein the dry mixture comprises a plurality of nanocrystalline diamond coated polycrystalline diamond particles (NDCPD), wherein the plurality of nanocrystalline diamond particles are homogenously distributed around each of the plurality of polycrystalline diamond particles; forming a dried mixture after drying the mixture, wherein the dried mixture comprises the plurality of plurality of nanocrystalline diamond particles homogenously distributed about each of the plurality of polycrystalline diamond particles, and wherein the plurality of polycrystalline diamond particles are distributed homogenously throughout the dried mixture; and sintering the dry mixture to form the cutter element.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings.

It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the disclosed embodiments of the invention, reference will now be made to the accompanying drawings, wherein.

DETAILED DESCRIPTION OF THE DISCLOSED EMBODIMENTS

Figure 1:
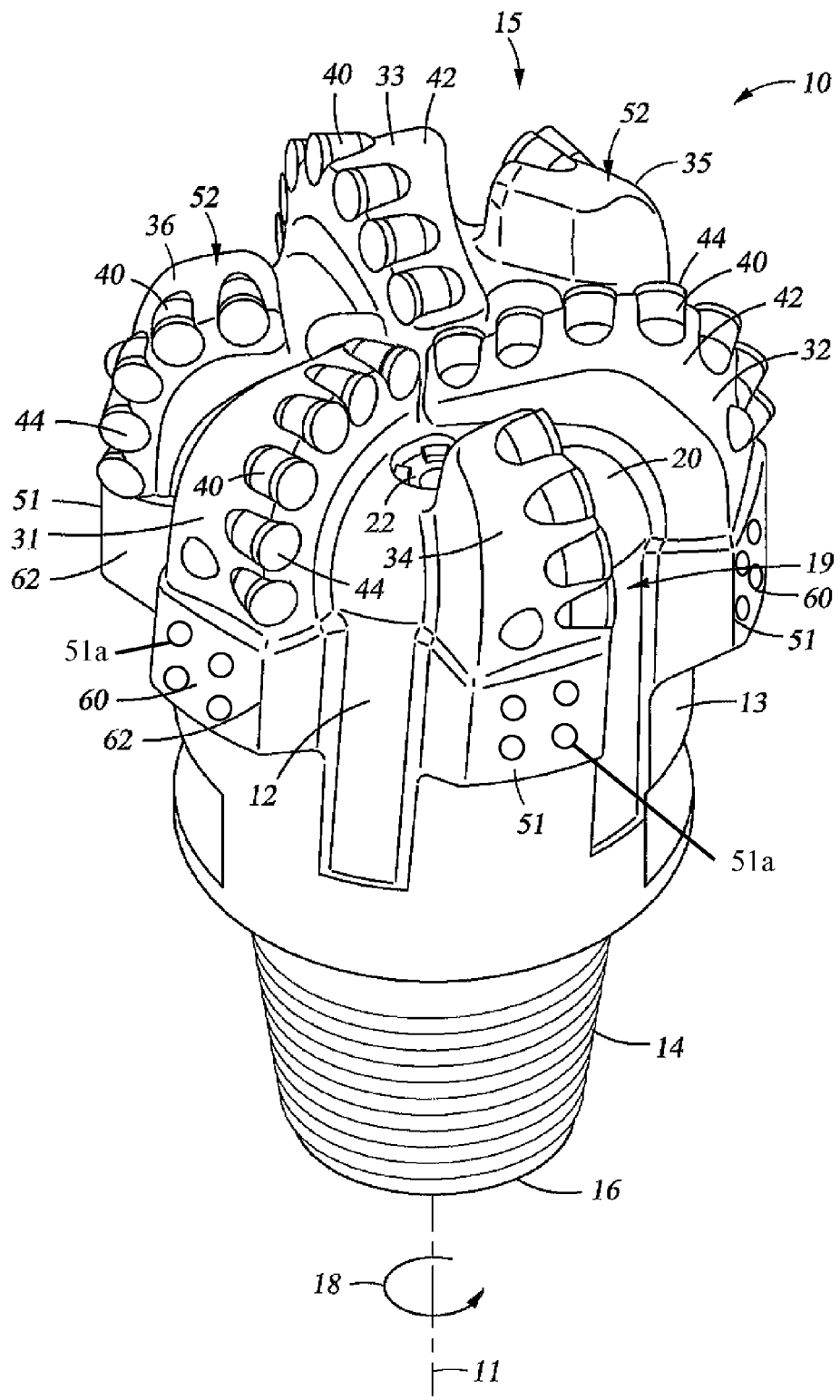
FIG. 1 is a perspective view of an embodiment of a drill bit made in accordance with principles described herein.

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form, and some details of conventional elements may be omitted in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection via other intermediate devices and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims will be made for purposes of clarity, with "up", "upper", "upwardly" or "upstream" meaning toward the surface of the borehole and with "down", "lower", "downwardly" or "downstream" meaning toward the terminal end of the borehole, regardless of the borehole orientation. As used herein, the term "about," when used in conjunction with a percentage or other numerical amount, means plus or minus 10% of that percentage or other numerical amount. For example, the term "about 80%," would encompass 80% plus or minus 8%.

Figure 2:
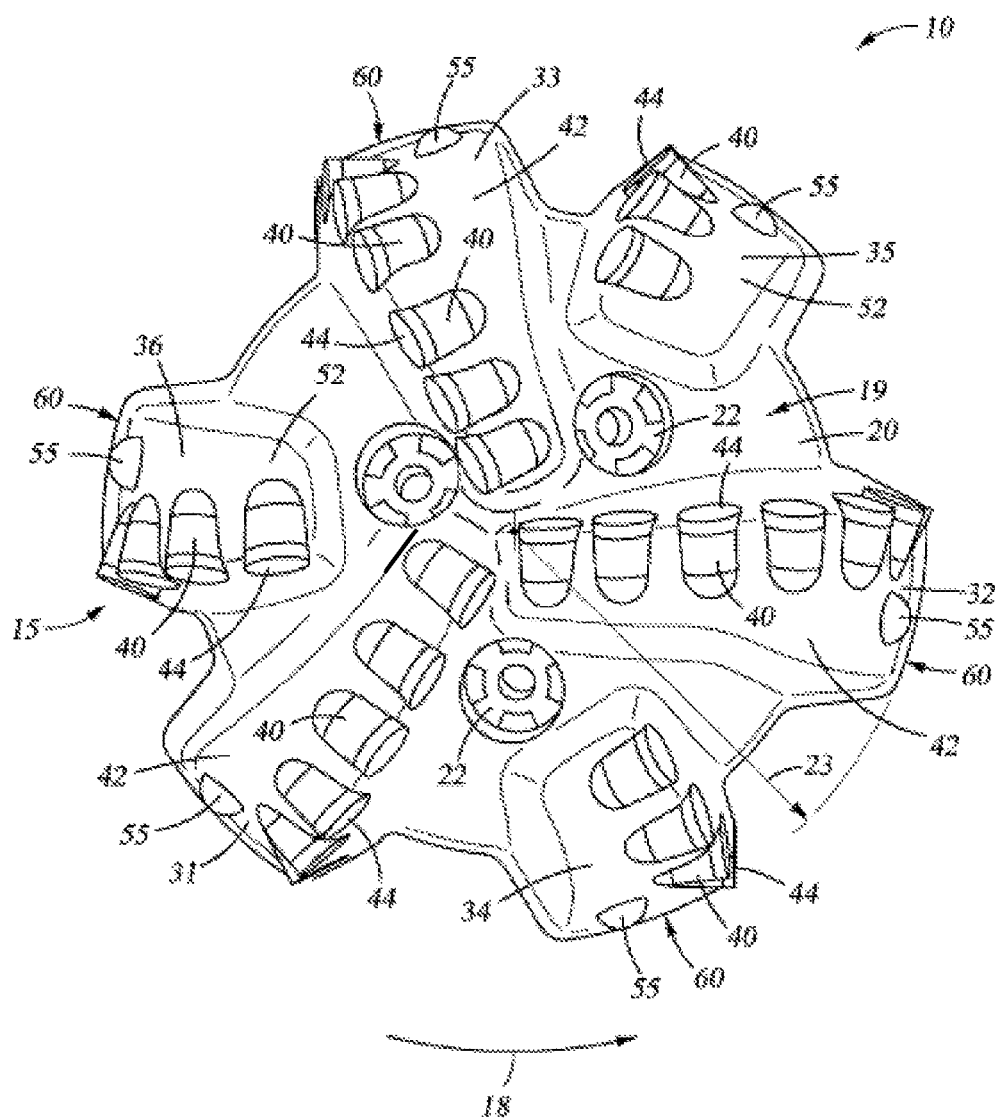
FIG. 2 is a top view of the bit of FIG. 1.

Referring to FIGS. 1 and 2, exemplary drill bit 10 is a fixed cutter PDC bit adapted for drilling through formations of rock to form a borehole. Bit 10 generally includes a bit body 12, a shank 13 and a threaded connection or pin 14 for connecting bit 10 to a drill string (not shown), which is employed to rotate the bit in order to drill the borehole. Bit face 20 supports a cutting structure 15 and is formed on the end of the bit 10 that faces the formation and is generally opposite pin end 16. Bit 10 further includes a central axis 11 about which bit 10 rotates in the cutting direction represented by arrow 18. As used herein, the terms "axial" and "axially" generally mean along or parallel to a given axis (e.g., bit axis 11), while the terms "radial" and "radially" generally mean perpendicular to the axis. For instance, an axial distance refers to a distance measured along or parallel to a given axis, and a radial distance refers to a distance measured perpendicular to the axis.

Body 12 may be formed in a conventional manner using powdered metal tungsten carbide particles in a binder material to form a hard metal cast matrix. Alternatively, the body can be machined from a metal block, such as steel, rather than being formed from a matrix.

Figure 3:
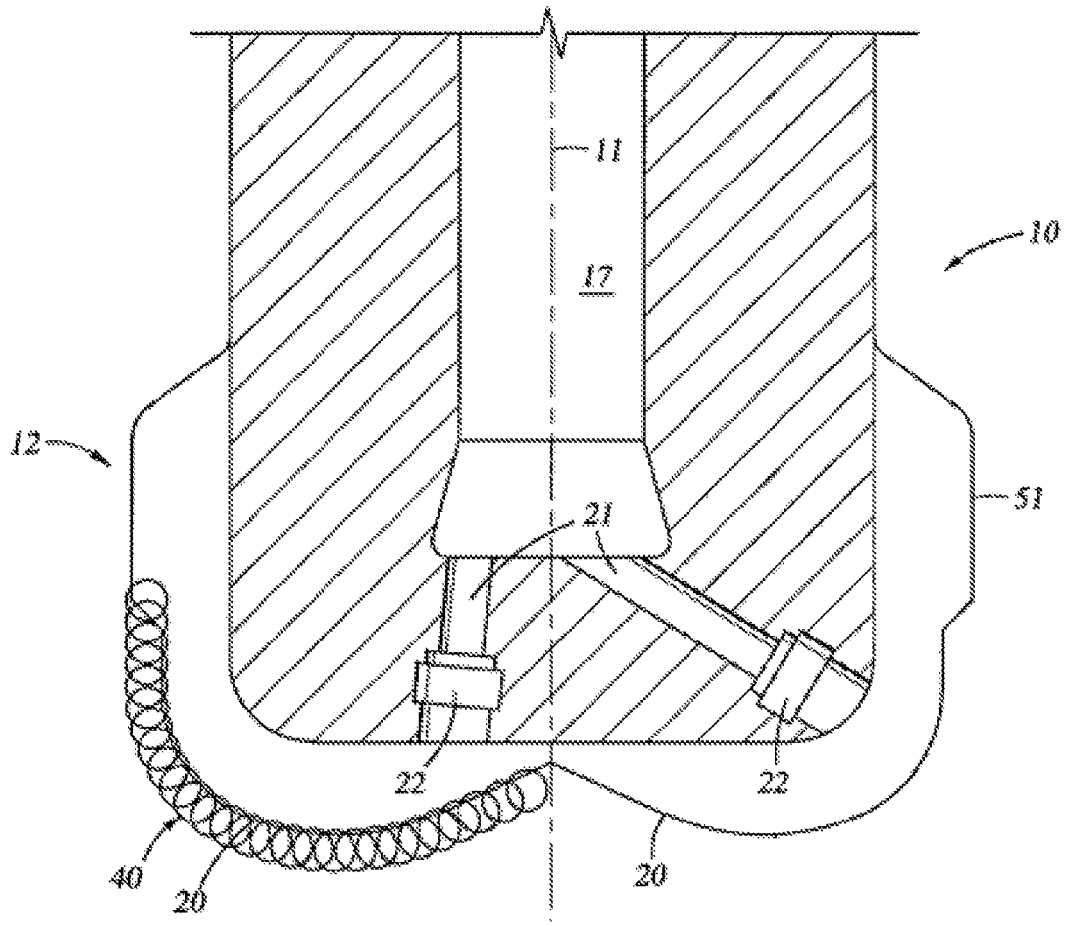
FIG. 3 is a partial cross-sectional view of the bit of FIG. 1 with the blades and the cutting faces of the cutter elements rotated into a single composite profile.

As best seen in FIG. 3, body 12 includes a central longitudinal bore 17 permitting drilling fluid to flow from the drill string into bit 10. Body 12 is also provided with downwardly extending flow passages 21 having ports or nozzles 22 disposed at their lowermost ends. The flow passages 21 are in fluid communication with central bore 17. Together, passages 21 and nozzles 22 serve to distribute drilling fluids around cutting structure 15 to flush away formation cuttings during drilling and to remove heat from bit 10.

Referring again to FIGS. 1 and 2, cutting structure 15 is provided on bit face 20 and includes a plurality of blades which extend along bit face 20. In the embodiment illustrated in FIGS. 1 and 2, cutting structure 15 includes six blades 31, 32, 33, 34, 35, and 36. In this embodiment, the blades are integrally formed as part of, and extend from, bit body 12 and bit face 20. The blades extend generally radially along bit face 20 and then axially along a portion of the periphery of bit 10.

In particular, blades 31, 32, 33 extend radially from proximal central axis 11 toward the periphery of bit 10. Blades 34, 35, 36 are not positioned proximal bit axis 11, but rather, extend radially along bit face 20 from a location that is distal bit axis 11 toward the periphery of bit 10. Blades 31, 32, 33 and blades 34, 35, 36 are separated by drilling fluid flow courses 19.

Referring still to FIGS. 1 and 2, each blade, 31, 32, 33 includes a cutter-supporting surface 42 for mounting a plurality of cutter elements, and each blade 34, 35, and 36 includes a cutter-supporting surface 52 for mounting a plurality of cutter elements. A plurality of forward-facing cutter elements 40, each having a cutting face 44, are mounted to cutter-supporting surfaces 42, 52 of blades 31, 32, 33 and blades 34, 35, 36, respectively. In particular, cutter elements 40 are arranged adjacent to one another in a radially extending row proximal the leading edge of each blade 31, 32, 33 34, 35, 36.

Referring still to FIGS. 1 and 2, bit 10 further includes gage pads 51 of substantially equal axial length measured generally parallel to bit axis 11. Gage pads 51 are disposed about the circumference of bit 10 at angularly spaced locations. Specifically, gage pads 51 intersect and extend from each blade 31-36. In this embodiment, gage pads 51 are integrally formed as part of the bit body 12.

Gage-facing surface 60 of gage pads 51 abut the sidewall of the borehole during drilling. The pads can help maintain the size of the borehole by a rubbing action when cutter elements 40 wear slightly under gage. Gage pads 51 also help stabilize bit 10 against vibration. In certain embodiments, gage pads 51 include flush-mounted or protruding cutter elements 51a embedded in the gage pads to resist pad wear and assist in reaming the bore hole side wall. Therefore, as used herein, the term "cutter element" is used to include at least the above-described forward-facing cutter elements 40 and flush or protruding elements 51a embedded in the gage pads, all of which may be made in accordance with the principles described herein.

Referring now to FIGS. 1, 2, 4a, and 4b, each cutter element 40 comprises an elongated and generally cylindrical support member or substrate which is received and secured in a pocket formed in the surface of the blade to which it is fixed. In general, each cutter element may have any suitable size and geometry.

Figure 4A:
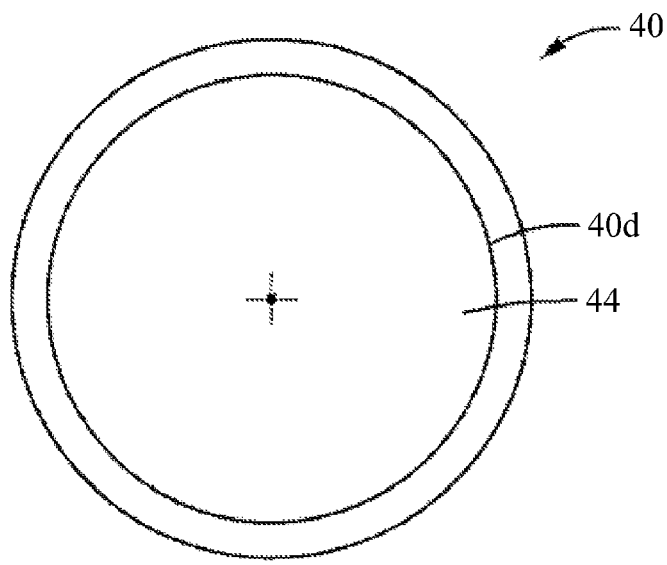
FIGS. 4A and 4B are end and side views, respectively, of an exemplary PDC cutter element of the bit of FIG. 1 in accordance with principles described herein.
Figure 4B:
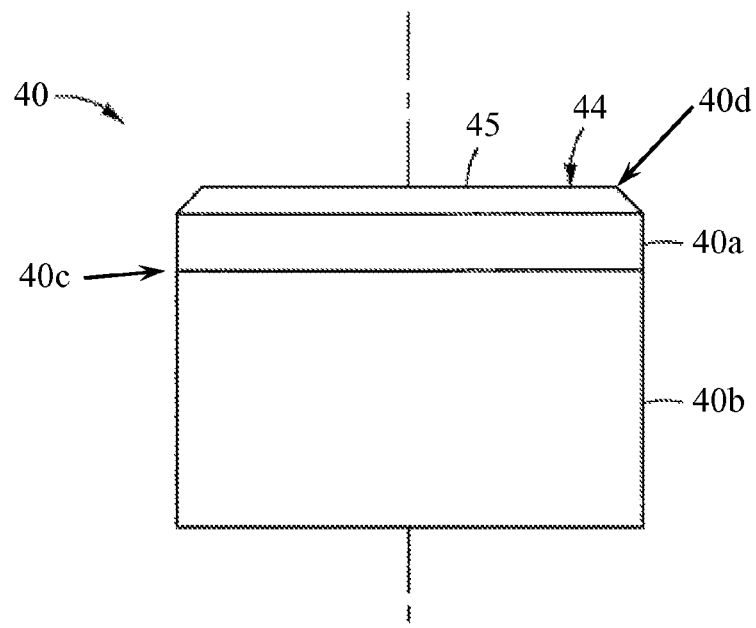

Referring to FIGS. 4A and 4B, one cutter element 40 is shown, it being understood that each cutter element 40 of bit 10 is the same. In this embodiment, cutter element 40 includes a PDC table 40a mounted to a cylindrical tungsten carbide (WC) substrate 40b. The exposed end of table 40a defines cutting face 44. The interface 40c between PDC table 40a and substrate 40b may be planar or non-planar. Each cutter element 40 is mounted to the corresponding cutter-supporting surface 42, 52 with cutting face 44 oriented generally perpendicular to the direction of bit rotation. The central portion 45 of cutting face 44 is planar in this embodiment, although concave, convex, or ridged surfaces can be employed. The cutting edge 40d may extend about the entire periphery of table 40a, or along only a periphery portion to be located adjacent the formation to be cut.

Figure 5A:
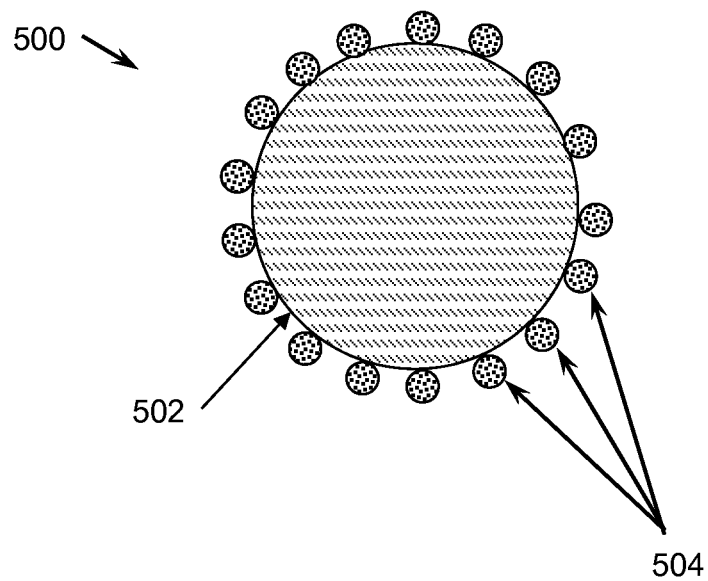
FIG. 5A is an enlarged schematic cross-sectional view of one exemplary diamond coated diamond particle of the cutting table of the PDC cutter element of FIGS. 4A and 4B.
Figure 5B:
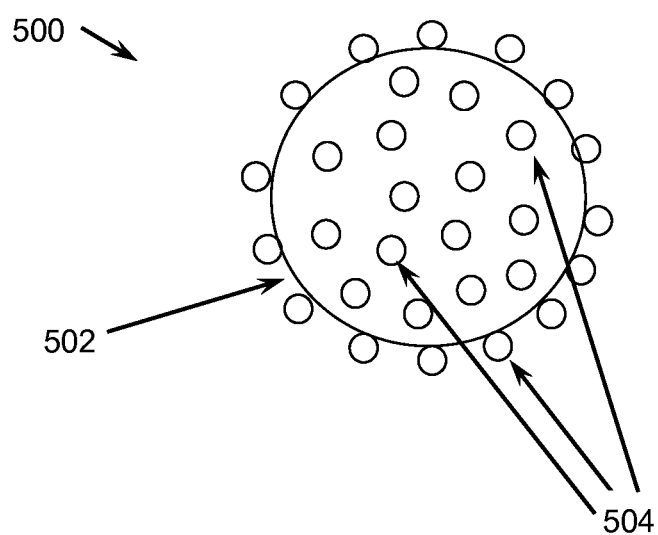
FIG. 5B is an enlarged schematic side view of the diamond coated diamond particle of FIG. 5A.

As will be described in more detail below, table 40a of cutting element 40 is comprised of diamond coated diamond particles as depicted in FIGS. 5A and 5B. The outer polycrystalline diamond particles are generally smaller, nanocrystalline diamond particles, and the inner coated polycrystalline diamond particle is a generally larger micron polycrystalline diamond particle. The outer nanocrystalline diamond particles may also be referred to herein as "nanoparticles" or "nano-satellited diamond particles." When sintered under high pressure and high temperature (HPHT) conditions, such nanocrystalline diamond coated diamond particles exhibit enhanced bonding between diamond grains within the table 40a, by generating a greater number of grain boundaries and diamond-to-diamond bonds per unit of surface area as compared to some conventional PD materials and cutter elements. Consequently, tables 40a offers the potential for increased density and thermal stability.

Referring now to FIGS. 5A and 5B, an enlarged view of one exemplary nanocrystalline diamond coated diamond particle 500 of diamond table 40a is shown. In FIG. 5A, a single, inner micron-sized polycrystalline diamond particle 502 is shown in a cross-section with a homogenous distribution of a plurality of smaller nanocrystalline diamond particles 504. In FIG. 5B, a side view of the single micron-sized polycrystalline diamond particle 502 coated with the homogenous distribution of nanocrystalline diamond particles 504 is shown. In embodiments described herein, each nanocrystalline diamond particle 504 preferably has a size ranging from 0.1 nm to about 100 nm, more preferably ranging from 1.0 nm to 50.0 nm, more preferably ranging from 1.0 nm to 25.0 nm, and even more preferably ranging from 1.0 nm to 10.0 nm. In addition, each micron-sized diamond particle 502 preferably has a size ranging from 10 μm to 50 μm, and more preferably ranges from 15 μm to 50 μm. In some embodiments, the nanocrystalline diamond particles 504 have a size that is less than or equal to 10% of the size of the micron-sized polycrystalline diamond particles 502.

In this embodiment, each particle 504 has substantially the same size, and each particle 502 has substantially the same size. However, in other embodiments, the nanocrystalline diamond particles (e.g., particles 504) comprise a first plurality of nanocrystalline diamond particles, each having substantially the same size preferably between 1.0 nm to 10.0 nm, and a second plurality of nanocrystalline diamond particles, each having substantially the same size that is preferably between 1.0 nm to 10.0 nm but different than the first plurality of nanocrystalline diamond particles.

Figure 6A:
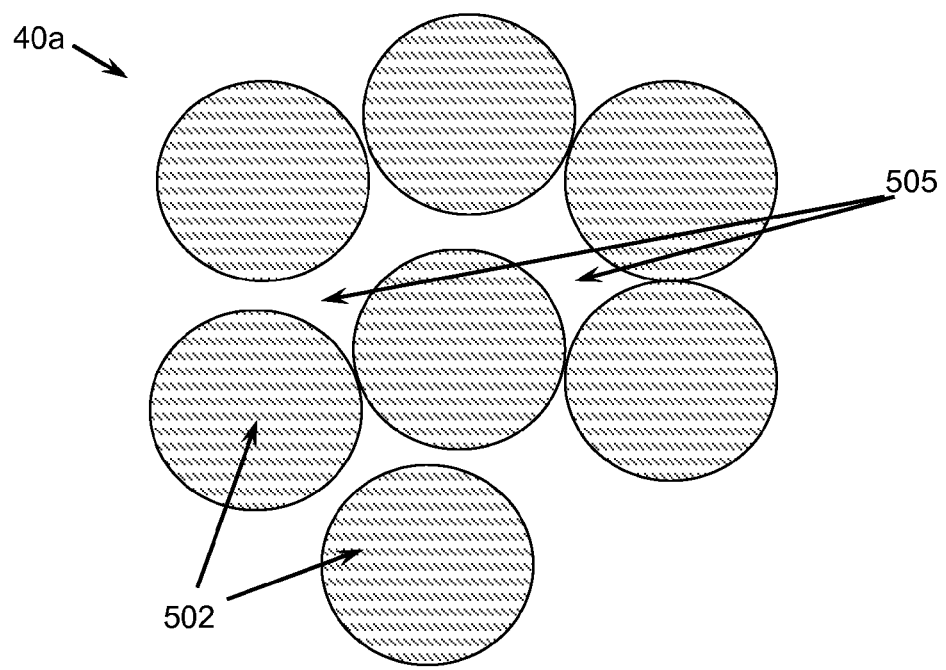
FIG. 6A is an enlarged partial cross-sectional view of the diamond table of the PDC cutter element of FIGS. 4A and 4B with the nanocrystalline diamond particles hidden for illustrative purposes.
Figure 6B:
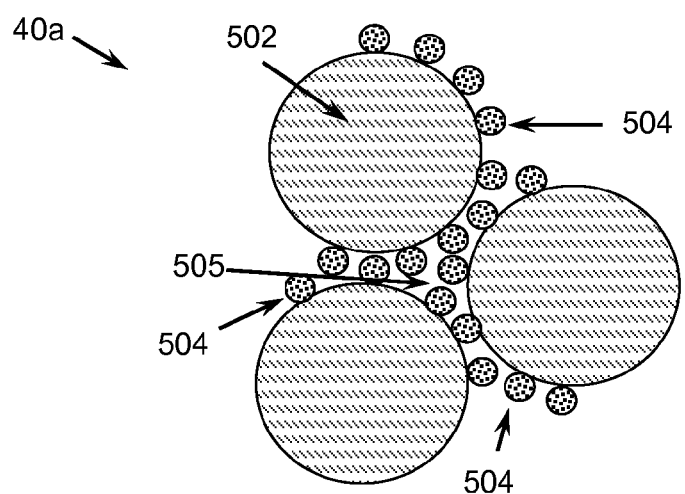
FIG. 6B is an enlarged partial cross-sectional view of the diamond table of the PDC cutter element of FIGS. 4A and 4B.

Referring now to FIGS. 6A and 6B, enlarged partial cross-sectional views of diamond table 40a illustrating a plurality of sintered nanocrystalline diamond coated diamond particles 500 is shown. In FIG. 6A, nanocrystalline diamond particles 504 are hidden to illustrate the gaps 505 between the plurality of closely-packed micron-sized polycrystalline diamond particle 502. As best shown in FIG. 6B, the plurality of nanocrystalline diamond particles 504 coating the micron-sized polycrystalline diamond particle 502 are disposed in and substantially fill gaps 505. In particular, nanocrystalline diamond particles 504 are homogenously dispersed among and between the plurality of micron-sized polycrystalline diamond particle 502, thereby effectively reducing the size of gaps 505 between micron-sized polycrystalline diamond particle 502. By filling gaps 505 and effectively decreasing the size of gaps 505, diamond table 40a has an increased density and associated advantages as compared to conventional diamond tables that do not include nanocrystalline diamond coated diamond particles (e.g., particles 500). In FIG. 6B, diamond particles 502, 504 are shown with different cross-hatchings for illustrative purposes. In general, the pluralities of diamond particles 502, 504 can have the same or different compositions.

Figure 7A:
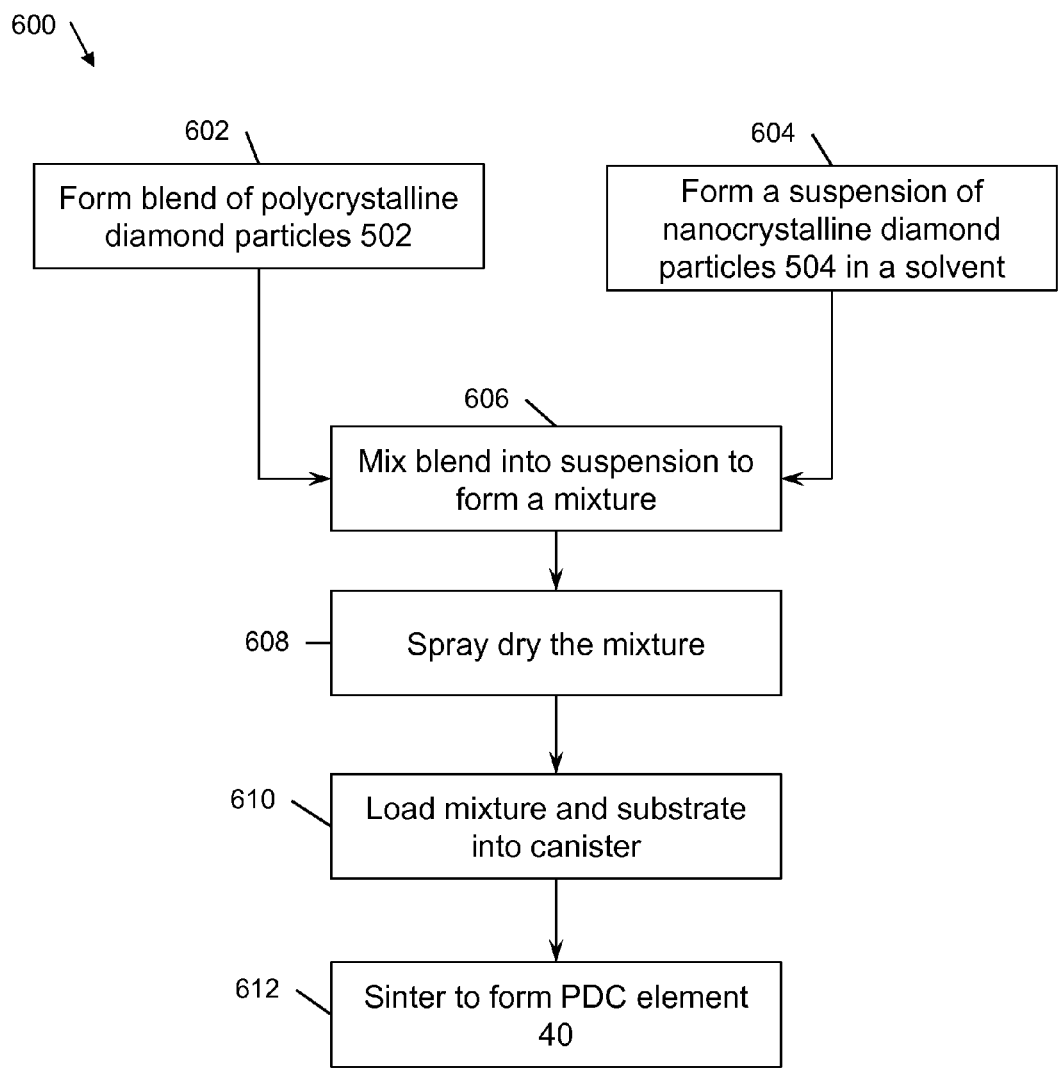
FIG. 7A is a graphical illustration of an embodiment of a method for making the PDC cutter element of FIGS. 4A and 4B.

Referring now to FIG. 7A, an embodiment of a method 600 for manufacturing a PDC cutter element 40 including table 40a made from a plurality of nanocrystalline diamond coated diamond particle 500 is shown. Starting in block 602, a blend of a plurality of polycrystalline diamond particles 502 is formed. The first plurality of polycrystalline diamond particles 502 each have about the same average size, which as previously described, preferably ranges from 15.0 μm to 50.0 μm. Moving now to block 604, a suspension of nanocrystalline diamond particles 504 is formed in a solvent. The solvent is preferably selected from the group consisting of ionic solvents, non-ionic solvents, hydrophobic solvents, hydrophilic solvents, cyclohexane, water, and alcohols.

Next, in block 606, the blend of polycrystalline diamond particles 502 is mixed into the suspension of nanocrystalline diamond particles 504 to form a mixture. The blend formed at block 602 preferably has a homogenous distribution, the suspension formed at block 604 preferably has a homogenous distribution, and the mixture formed at block 606 preferably has a homogeneous distribution of both micron-sized polycrystalline diamond particles 502 and nanocrystalline diamond particles 504 so that the nanoparticles 504 are homogenously distributed around and between the larger, micron-sized polycrystalline particles 502. Once a wet mixture has been formed at block 606, the homogenous distribution of the micron-sized polycrystalline diamond particles 502 and nanocrystalline diamond particles 504 is preferably maintained such that the sintered diamond table 40a subsequently formed has a homogenous distribution of micron-sized polycrystalline diamond particles 502 and nanocrystalline diamond particles 504. The wet mixture is spray dried in block 608. In particular, a spray drying station is used to dry the mixture while maintain homogeneity of the particle dispersion. In this embodiment, the wet mixture is disposed in a chamber, for example, a vertical chamber, and enters the top of the chamber as a wet mixture. The mixture is dried as gravity pulls it to the bottom of the chamber, where it is a dry mixture comprising homogeneously distributed micron-sized polycrystalline diamond particles 502 and nanocrystalline diamond particles 504.

The dry mixture is then loaded into a canister along with a WC substrate at block 610. The order of the loading of the mixture and the substrate may depend on the application or sintering vessel. In embodiments described herein, the substrate is a cemented carbide. For example, the substrate can be a cemented carbide such as tungsten carbide, either in the form of WC and/or $W_2C$. Tungsten carbides comprise spherical cast $WC/W_2C$, cast and crushed $WC/W_2C$, and macro-crystalline WC. For hardness properties, the spherical cast $WC/W_2C$ has greater hardness than cast and crushed $WC/W_2C$, which in turn has greater hardness than macro-crystalline WC. For toughness properties, the Spherical Cast $WC/W_2C$ has greater toughness than Macro-crystalline WC, which in turn has greater toughness than cast and crushed $WC/W_2C$. As another example, the cemented carbide can be a metal matrix composite where tungsten carbide particles are the aggregate and a metal binder material comprising Co, Ni, Fe, Cr, B and alloys thereof, serve as the matrix. During sintering described in more detail below, the binder material, such as cobalt, becomes the liquid phase and WC grains (with a higher melting point) remain in the solid phase. As a result of this process, cobalt embeds or cements the WC grains and thereby creates the metal matrix composite with its distinct material properties. The naturally ductile cobalt metal serves to offset the characteristic brittle behavior of the tungsten carbide ceramic, thus raising its toughness and durability. Properties of the substrate can be changed significantly by modifying the tungsten carbide grain size, cobalt content (e.g. alloy carbides) and carbon content.

At block 612, dry mixture and substrate loaded in the canister is subjected to a high pressure, high temperature (HPHT) sintering process to form PDC element 40. The HPHT sintering process is preferably performed at a pressure of at least 40 kilobar and at a temperature of at least 1000° C. During the HPHT sintering process, the nanocrystalline diamond coated polycrystalline diamond particles 500 that are in contact with each other bond to each other. The presence of the nanocrystalline diamond particles 504 that are satellite, homogeneously distributed, on and around the surface of the larger polycrystalline diamond particles 502 of the blend, greatly increase the surface area of the nanocrystalline diamond coated polycrystalline diamond particles 500, in comparison to an uncoated diamond particles, thereby offering the potential to increase diamond-to-diamond bonding, and increase the number of grain boundaries formed per unit of surface area of the cutting table. Simultaneously, there is a reduction in the volume of the interstitial pools of metal catalyst created during formation of the PD table 40a, and a subsequent reduction in the thermal instability typically associated with PD cutting tables comprising such pools of metal catalyst, which as described earlier, become molten under in-service temperatures, dissolve the diamond to diamond bonds of the table, and result in chipping and cracking of the PD cutting edge. In some embodiments of PD tables disclosed herein (e.g., table 40a), the number of diamond-to-diamond bonds per unit of surface area is greater as compared to conventional PD cutter elements, whereby the number of diamond-to-diamond bonds increases the strength of the PD table; see for example U.S. Pat. No. 7,972,397 and U.S. Patent Application No. 2011/0252711 each of which is incorporated herein in by reference in its entirety Referring now to FIG. 7B, another embodiment a method 700 for manufacturing a PDC cutter element 40 including table 40a made from a plurality of nanocrystalline diamond coated diamond particle 500 is shown. In this embodiment, zeta potentials are used to form a homogeneous distribution. As is known in the art, zeta potential is a physical property exhibited by particles in suspension. More specifically, a liquid layer surrounding a particle comprises two parts or regions—an inner region surrounding the particles, referred to as the Stern layer, and an outer region, referred to as the diffuse layer. In the Stern layer, the ions are strongly bounded and in the diffuse layer the ions are less strongly bonded. The diffuse layer also comprises a notional boundary wherein the ions and particles form a stable entity. If, for example due to gravity, a particle moves, the ions within the boundary move with it and the ions beyond the boundary stay with the bulk dispersant. The potential at the notional boundary in the diffuse layer, which may also be described as the surface of hydrodynamic shear, is the zeta potential. The zeta potential may be negative or positive, but it is the magnitude of that value that indicates the potential stability of the colloidal system. For example, if a colloidal system has a large positive or negative zeta potential, those particles will tend to repel each other, and thus, there will be less or no tendency for the particles to clump, cluster, or otherwise come together in a non-homogeneous distribution. In contrast, if the particles have a low negative or positive zeta potential value, then the forces are not present to prevent the particles from coming together and flocculating. In embodiments described herein that rely on zeta potentials to form a homogeneous distribution, the zeta potential preferably has an absolute value of at least 30 mV (i.e., the zeta potential is less than or equal to −30 mV or greater than or equal to +30 mV), and may have an absolute value of up to 100 mV. In general, a zeta potential with an absolute value from 30 to 40 mV (i.e., the zeta potential is between −30 mV and −40 mV, or between +30 mV and +40 mV) indicates a moderately stable colloid, a zeta potential with an absolute value from 40 to 60 mV (i.e., the zeta potential is between −40 mV and −60 mV, or between +40 mV and +60 mV) indicates good stability, and a zeta potential with an absolute value greater than or equal to 61 mV (i.e., the zeta potential is less than or equal to −61 mV, or greater than or equal to +60 mV) indicates a relatively high stability. It should be appreciated that the level of stability sought may depend on the end application.

Figure 7B:
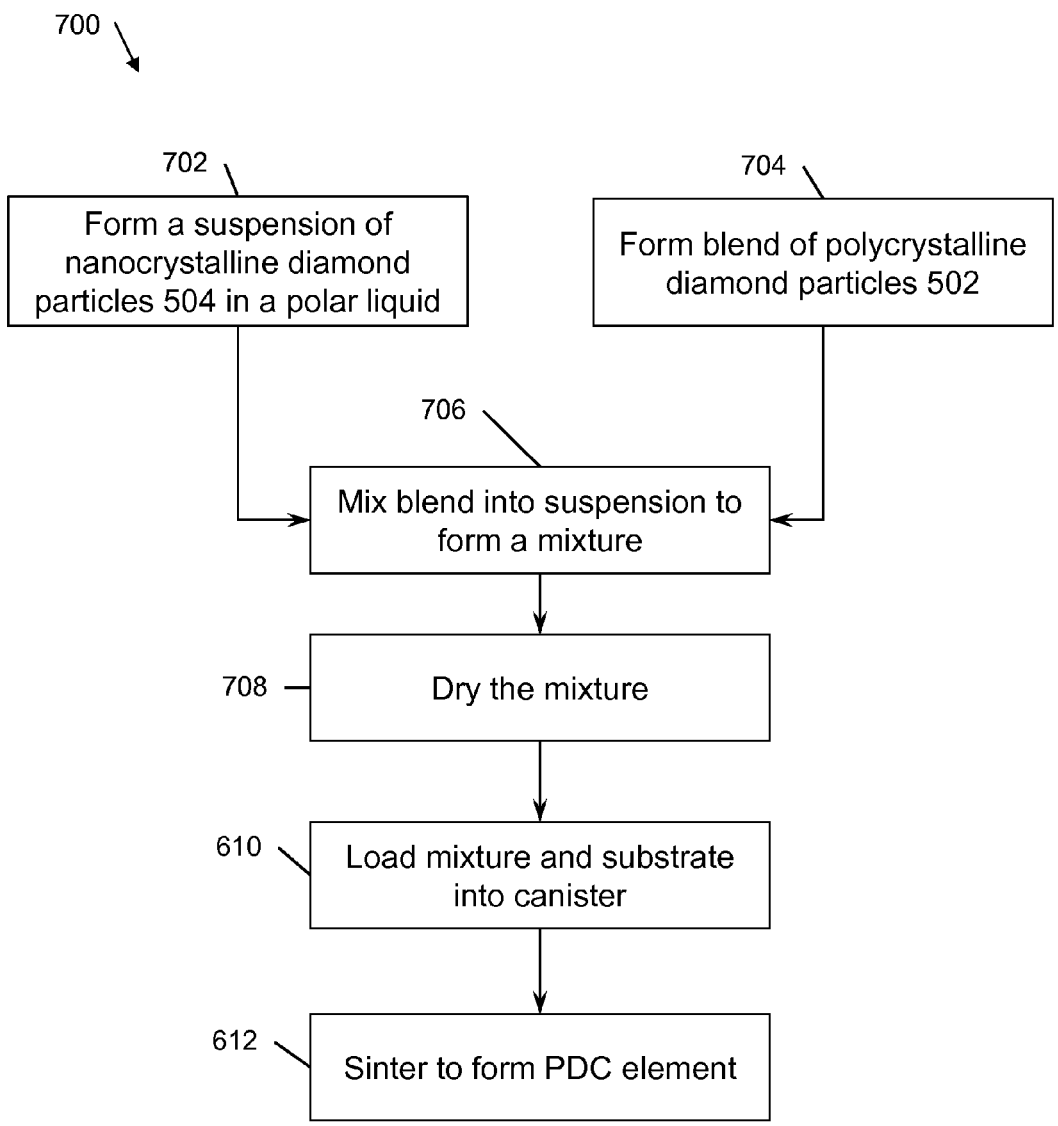
FIG. 7B is a graphical illustration of an embodiment of a method for making the PDC cutter element of FIGS. 4A and 4B.

Referring still to FIG. 7B, at block 702 a suspension of nanocrystalline diamond particles 504 in a polar liquid such as water, alcohol, or glycol is formed. The polar liquid affects the zeta potential of the nanocrystalline diamond particles 504, each of which preferably has a size ranging from 1.0 nm to 10.0 nm, and creates a homogeneous distribution among the nanocrystalline diamond particles 504. At block 704, a blend of micron-sized polycrystalline diamond particles 502, each preferably having a size ranging from 10 μm to 50 μm is formed. Moving now to block 706, the blend of polycrystalline diamond particles 502 is disposed in the suspension of nanocrystalline diamond particles 504 to form a mixture that is subsequently dried at block 708. In general, the mixture can be dried by a solgel method or by spray drying previously described with respect to block 608 of method 600 in FIG. 7A. The solgel method for drying is a wet-chemical technique for the manufacture of materials initiated from a colloidal solution as described herein with respect to both the micron-sized and nano-sized particles. The solgel method includes a plurality of phases including solution, gelation, drying, and densification. The solution may be made as discussed above with respect to forming the mixture of nanoparticles 504 and micron-sized particles 502 in a polar liquid. In a solgel drying process, the solvent phase of, for example, a colloid such as the mixture of nano- and micron-sized particles. The method of solgel drying used may depend on the intended use of the dried material as fragmentation may be a consideration. A solgel drying method that may be employed at block 708 removes the solvent, forming a homogenous distribution of nanoparticles 504 and micron-sized particles 502 in a dried mixture.

The dry mixture is then loaded into a canister along with a WC substrate at block 610 as previously described. Then, at block 612 as previously described, the dry mixture and substrate loaded in the canister is subjected to a high pressure, high temperature (HPHT) sintering process to form PDC element 40.

In general, methods 600, 700 for forming cutter element 40 with PD diamond table 40a can be performed using any sized diamond particles 502, any sized diamond particles 504, and with different wt % of particles 502, 504. For example, in one embodiment, the mixture formed in block 606, 706 comprises diamond particles 502 having sizes of 5.0 μm and nanocrystalline diamond particles 504 having sizes of 1.0 nm, with the nanocrystalline diamond particles 504 being 0.01 wt. % of the mixture. In another embodiment, the mixture formed in block 606, 706 comprises diamond particles 502 having sizes of 12.0 μm and nanocrystalline diamond particles 504 having sizes of 1.0 nm, with the nanocrystalline diamond particles 504 being 0.03 wt. % of the mixture. In yet another embodiment, the mixture formed in block 606, 706 comprises diamond particles 502 having sizes of 36.0 μm and nanocrystalline diamond particles 504 having sizes of 1.0 nm, with the nanocrystalline diamond particles 504 being 0.07 wt. % of the mixture.

Figure 8A:
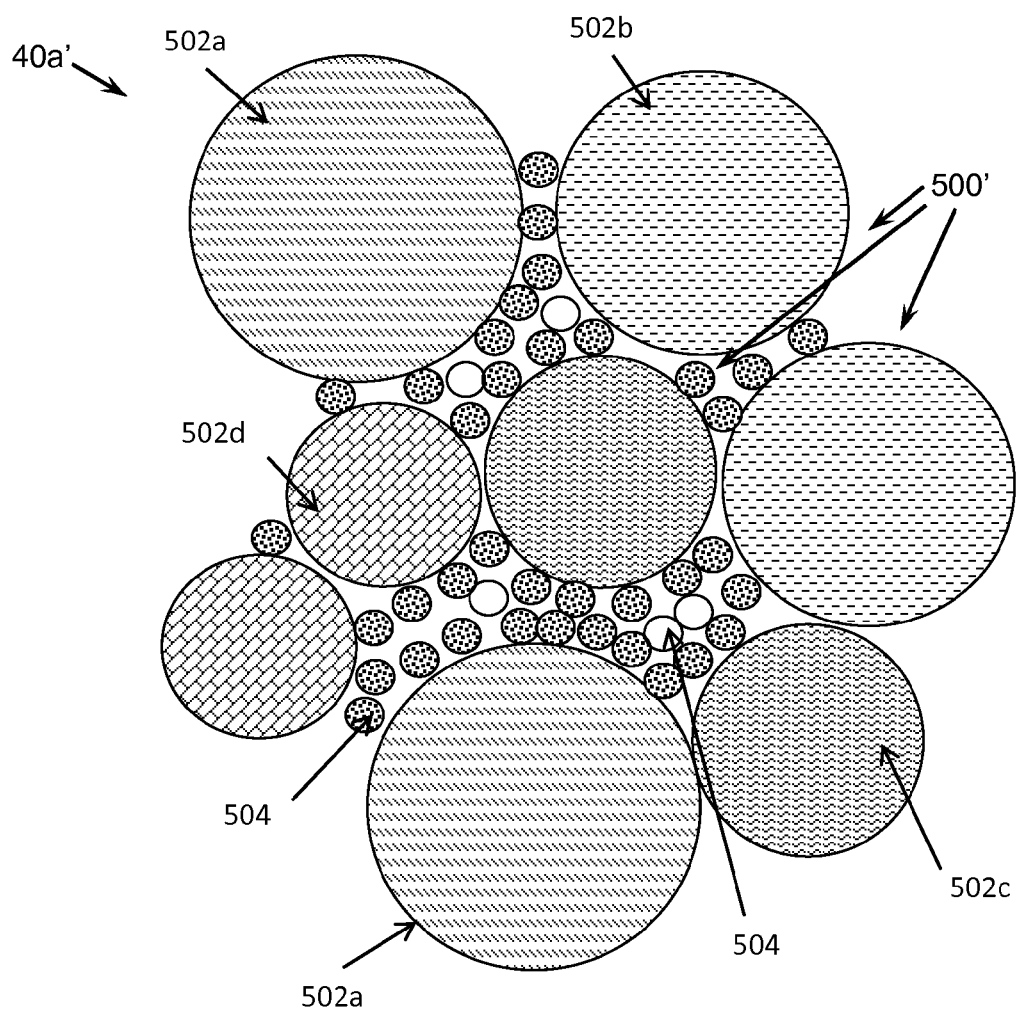
FIG. 8A is an enlarged partial cross-sectional view of an embodiment of a diamond table of a PDC cutter element.

In the embodiment shown in FIG. 6B, a plurality of similarly sized micron-sized polycrystalline diamond particles 502 are coated with a plurality of similarly sized nanocrystalline diamond particles 504. However, in other embodiments, the PD diamond table (e.g., table 40a) comprises more than one plurality of similarly sized relatively larger polycrystalline diamond particles (e.g., micron-sized polycrystalline diamond particles 502), each plurality having a different size as compared to the other pluralities of relatively larger polycrystalline diamond particles, and/or more than one plurality of similarly sized relatively smaller polycrystalline diamond particles (e.g., nanocrystalline diamond particles 504), each plurality having a different size as compared to the other pluralities of relatively smaller polycrystalline diamond particles. For example, referring now to FIG. 8A, an embodiment of a PD diamond table 40a' for a cutter element is shown. PD diamond table 40a' is similar to PD diamond table 40a previously described. Namely, PD diamond table 40a' comprises a plurality of sintered nanocrystalline diamond coated diamond particle 500'. However, unlike table 40a in which sintered nanocrystalline diamond coated diamond particle 500 comprise one plurality of similarly sized micro-sized polycrystalline diamond particles 502 and one plurality of similarly sized nanocrystalline diamond particles 504, in this embodiment, sintered nanocrystalline diamond coated diamond particle 500' comprise a first plurality of similarly sized micron-sized polycrystalline diamond particles 502a, a second plurality of similarly sized micron-sized polycrystalline diamond particles 502b, a third plurality of similarly sized micron-sized polycrystalline diamond particles 502c, a fourth plurality of similarly sized micron-sized polycrystalline diamond particles 502d, and a plurality of nanocrystalline diamond particles 504 dispersed homogenously among, between, and around the pluralities of micron-sized polycrystalline diamond particles 502a, 502b, 502c, 502d. It should be appreciated that FIG. 8A is a cross-sectional view of a three-dimensional structure, and thus, the diamond particles 504 coating diamond particles 502a, 502b, 502c, 502d shown in FIG. 8A are illustrated in cross-section, whereas the diamond particles 504 coating micro-sized polycrystalline diamond particles not shown in FIG. 8A are illustrated without any cross-hatching.

Diamond particles 502a, 502b, 502c, 502d each preferably have a size between 10 μm to 50 μm, and each diamond particle 504 preferably has a size ranging from 0.1 nm to about 100 nm, more preferably ranging from 1.0 nm to 50.0 nm, more preferably ranging from 1.0 nm to 25.0 nm, and even more preferably ranging from 1.0 nm to 10.0 nm. Diamond particles 502a have substantially the same size, diamond particles 502b have substantially the same size, diamond particles 502c have substantially the same size, diamond particles 502d have substantially the same size, and diamond particles 504 have substantially the same size, however, each plurality of diamond particles 502a, 502b, 502c, 502d has a different size. Namely, diamond particles 502a have sizes larger than diamond particles 502b, which have sizes larger than diamond particles 502c, which have sizes larger than diamond particles 502d. In FIG. 8, diamond particles 502a, 502b, 502c, 502d, 504 are shown with different cross-hatchings for illustrative purposes. In general, the pluralities of diamond particles 502a, 502b, 502c, 502d, 504 can have the same or different compositions.

Figure 8B:
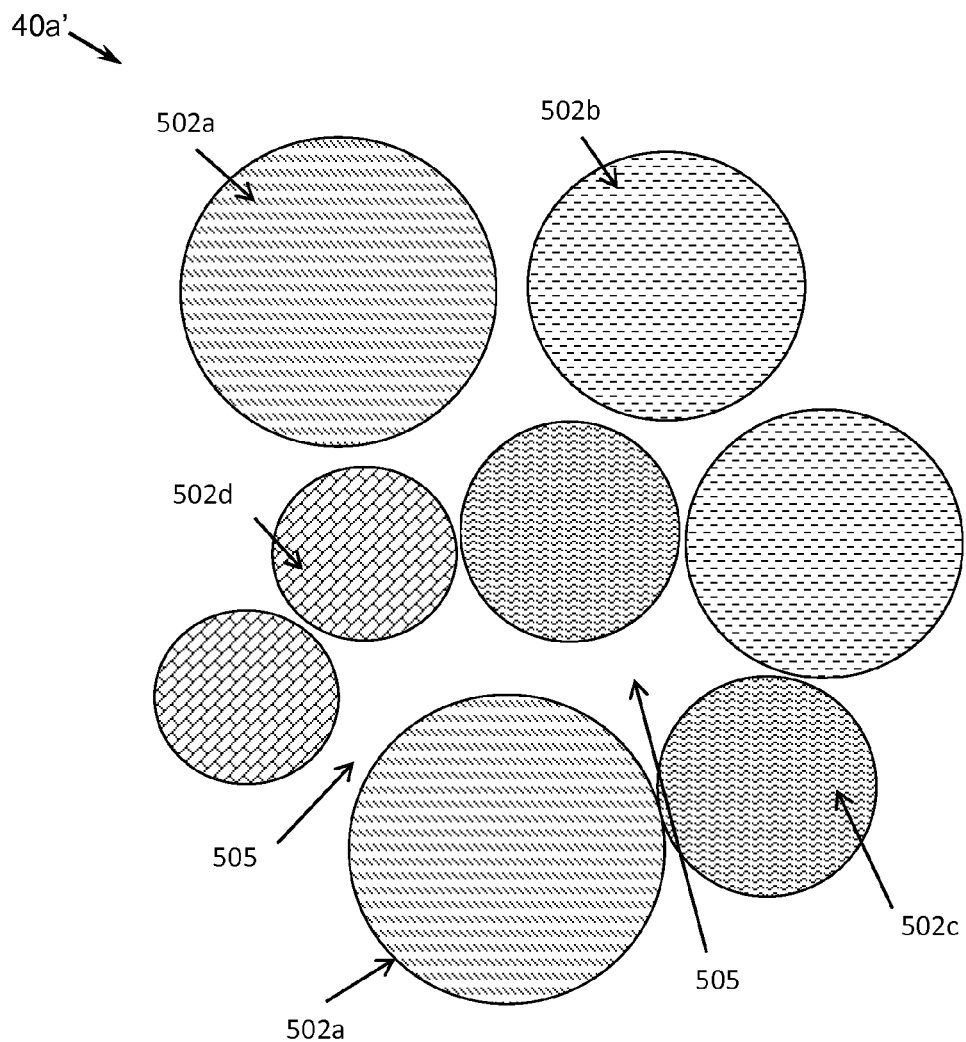
FIG. 8B is an enlarged partial cross-sectional view of the diamond table of FIG. 8A with the nanocrystalline diamond particles hidden for illustrative purposes.

Referring briefly to FIG. 8B, PD diamond table 40a' is shown with nanocrystalline diamond particles 504 hidden to more clearly illustrate spaces 510 between micro-sized polycrystalline diamond particles 502a, 502b, 502c, 502d. A comparison of FIGS. 8 and 9 illustrates that even with four pluralities of differently sized micron-sized polycrystalline diamond particles 502a, 502b, 502c, 502d, nanocrystalline diamond particles 504 can still be used to improve the density and strength of sintered nanocrystalline diamond coated diamond particle 500' and PD table 40a'.

In general, a cutter element including PD table 40a' can be made in the same manner(s) as cutter element 40 including PD table 40a previously described. More specifically, methods 600, 700 can be employed to manufacture a cutter element having PD table 40a' mounted to a WC substrate. However, in methods 600, 700, the blends of micron-sized polycrystalline diamond particles made in blocks 602, 704, respectively, comprise pluralities of different sized diamond particles 502a, 502b, 502c, 502d.

In general, methods 600, 700 for forming a cutter element 40 with PD diamond table 40a' can be performed using any sized diamond particles 502a, 502b, 502c, 502d, any sized diamond particles 504, and with different wt % of particles 502a, 502b, 502c, 502d, 504. For example, in one embodiment, the mixture formed in block 606, 706 comprises about 5 to 10 wt % of diamond particles 502a, about 70 to 80 wt % of diamond particles 502b, about 1 to 5 wt % of diamond particles 502c, about 1 to 5 wt % of diamond particices 502d; and about 0.01 to 1 wt % of diamond particles 504. In some embodiments, the mixture formed in block 606, 706 also comprises about 1 wt % tantalum and about 1 wt % tungsten. Moreover, in some embodiments, the mixture formed in block 606, 706 comprises diamond particles 502a having sizes of about 15 μm to 50 μm, preferably about 20 μm to 40 μm, and most preferably about 22 μm to 36 μm; diamond particles 502b having sizes of about 5 μm to 15 μm, and more preferably about 8 μm to 12 μm; diamond particles 502c having sizes of about 1 μm to 10 μm, and more preferably about 4 μm to 6 μm; and diamond particles 502d having sizes of about 0.01 μm to 5 μm, and more preferably about 1 μm to 3 μm.

In general, nanocrystalline diamond particles described herein (e.g., nanocrystalline diamond particles 504) can be formed naturally, such as a by-product of milling or other processing of natural diamonds, or may be synthetic, prepared by any suitable commercial method such as, but not limited to, high-pressure high-temperature (HPHT), explosive shock or detonation diamonds (DTD) formed by the reaction of TNT and RDX, chemical vapor deposition (CVD), physical vapor deposition (PVD), ultrasonic cavitation, and the like. Nanocrystalline diamond particles, typically comprise an outer surface of non-diamond (ND) carbons, such as amorphous carbon, carbon onions, and graphite which comprise $SP_2$ carbons, see for example Schrand et al., (Schrand, A. M, Hens, S. A., Shenderova, O. A., "Nanodiamond particles: Properties and Perspectives for Bioapplications", Critical Reviews in Solid State and Materials Sciences, 34:18-74, 2009), incorporated herein in by reference in its entirety.

In general, the nanocrystalline diamond particles can have a variety of different geometries including, without limitation, elongated geometry, spherical geometry, irregular geometry or combinations thereof. In some embodiments, the nanocrystalline diamond particles may derived from a commercial product such as uDiamond™ (Molto) available from Carbodeon (Finland). This commercial product comprises diamond particles having sizes between 4 nm and 6 nm, is non-functionalized, and is substantially free of $SP_2$ non-diamond carbon atoms and rich in $SP_3$ diamond carbon atoms.

The nanocrystalline diamond particles (e.g., diamond particles 504) are preferably formed of substantially SP3 carbon, and are preferably substantially free of SP2 non-diamond carbon atoms. For example, the nanocrystalline diamond particles can be treated or cleaned to remove the outermost $SP_2$ carbon onion and non-diamond carbon atoms. Such treated nanocrystalline diamonds are substantially free of surface $SP_2$ carbons, exhibit controlled net charge and reduced agglomeration. In addition, such cleaned nanocrystalline diamond species provide a basis for controlled derivaterization of the nanocrystalline diamond surface, which may provide increased control of suspension and coating parameters.

The nanocrystalline diamond particles (e.g., nanocrystalline diamond particles 504) may be derivatized with a chemical moiety to introduce functional groups comprising alkyl, alkenyl, alkynyl, carboxyl, hydroxyl, amino, amido, epoxy, keto, alkoxy, ether, ester, lactones, metallic groups, organometallic groups, polymeric groups, ionic groups, or combinations thereof. The nanocrystalline diamond particles may be also derivatized with a carboxylic acid moiety to carry a negative charge, with neutral polymer chains, or chains carrying either a negative or positive charge by adjusting the pH value of its aqueous solution. Polymer chains such as acrylic chains having carboxylic acid functional groups, hydroxy functional groups, and/or amine functional groups; polyamines such a polyethyleneamine or polyethyleneimine; and poly(alkylene glycols) such as poly(ethylene glycol) and polypropylene glycol), may be included by derivatization of the nanocrystalline diamond.

Derivatizing an $SP_2$ rich nanocrystalline diamond surface to include functional groups may produce a nanocrystalline diamond species that is more stable in solvent than some conventional $SP_2$ rich nanocrystalline diamond species, and thereby allowing more control of such species in a solvent. The type of charge a nanocrystalline diamond particle acquires, in for example a colloidal suspension, is relevant with respect to its sorption and electrophoretic applications, which in some embodiments are key to evenly coating the larger polycrystalline diamond particles and forming a uniform nanocrystalline diamond coated diamond particle.

The nanocrystalline diamond particles (e.g., diamond particles 502) can be doped, undoped or combinations thereof. Likewise, the micro-sized diamond particles (e.g., diamond particles 504) can be doped, undoped or combinations thereof. For example, the mixture formed in blocks 606, 706 can be doped with a dopant selected from the group consisting of Al, B, N, Ti, P, V, Ti, Cr, Ta, and Zr. In general, dopants may be added to increase conductivity, reduce the rate of grain growth, thereby controlling potential SP3 carbon solubilization within the molten catalyst to form undesirable carbon rich pools in the interstitial spaces that can reduce the strength of the PD table (e.g., PD table 40a). Any such dopant in the mixture is preferably present in an amount of about 10 atomic percent to about 0.001 atomic percent of the mixture, and more preferably present in an amount of about 1 atomic percent to about 0.01 atomic percent. In some embodiments, the mixture formed in blocks 606, 706 further comprises a metal catalyst selected from cobalt, iron, nickel, or alloys thereof.

In some embodiments, nanocrystalline diamond particles are hydrophilic and are suspended in ionic solvents such as water, alcohols, and NaOH solutions. Deagglomeration of the nanocrystalline diamond particles is preferably carefully controlled to produce a stable colloidal suspension, by controlling pH ranges, nanocrystalline diamond particle surface fictionalization, isoelectric points and concentration, thereby allowing optimal coating of the nanocrystalline diamond particles onto the surface of the larger polycrystalline particles, Further, in some embodiments shape and size of the nanocrystalline diamond particles may also influence the stability of the suspension and the optimization of coating, see for example Lewis, J. A. (.Lewis, J. A, J. AM. Ceram. Soc., 83 [10], 2341-59 (2000)) incorporated herein in by reference in its entirety.

Embodiments are therefore drawn to methods of making a polycrystalline diamond cutter elements that comprises forming a blend comprising a first particle size of polycrystalline diamond particles and at least a second particle size of polycrystalline diamond particles, where the second particle size is different from the first particle size. A suspension of nanocrystalline diamond particles is formed, wherein the nanocrystalline diamond particles are suspended in a solvent; and the blend is mixed into the suspension to form a polycrystalline diamond mixture. The mixture comprises less than 5% by weight of nanocrystalline diamond particles; and comprises nanocrystalline diamond coated polycrystalline diamond particles, the mixture and a substrate material is loaded into a container, and the mixture and the substrate material are sintered at high temperature and high pressure to form a polycrystalline diamond cutter element.

In some embodiments of the method described herein, the blend further comprises a third particle size of polycrystalline diamond particles, where the third particle size is different from the first and second particle size. In some further embodiments, the blend comprises a fourth polycrystalline diamond particle of a fourth particle size, where the forth particle size is different from the first, second and third particle size As such, some embodiments of the polycrystalline diamond cutting elements disclosed herein may have improved thermal stability and improved mechanical strength as compared to conventional PD cutting elements, and may be used in a variety of applications such as drilling tools (e.g., compacts, inserts, cutting elements, gage trimmers, etc.), machining equipment, bearing apparatuses, wire drawing machinery, and other apparatuses.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of making a cutter element for a drill bit, the method comprising:
    forming a suspension comprising a plurality of nanocrystalline diamond particles and a solvent, wherein the solvent is a polar liquid;
    disposing a plurality of polycrystalline diamond particles in the suspension to form a mixture, wherein a plurality of the plurality of nanocrystalline diamond particles are homogenously distributed about each of the plurality of polycrystalline diamond particles in the mixture, and wherein the plurality of polycrystalline diamond particles are distributed homogenously throughout the mixture;
    wherein the zeta potential of at least one of the suspension and the mixture is from ±30 to ±100 mV;
    drying the mixture using one of a spray-drying or a solgel process, wherein the dry mixture comprises a plurality of nanocrystalline diamond coated polycrystalline diamond particles (NDCPD), wherein the plurality of nanocrystalline diamond particles are homogenously distributed around each of the plurality of polycrystalline diamond particles;
    forming a dried mixture after drying the mixture, wherein the dried mixture comprises the plurality of the plurality of nanocrystalline diamond particles homogenously distributed about each of the plurality of polycrystalline diamond particles, and wherein the plurality of polycrystalline diamond particles are distributed homogenously throughout the dried mixture;
    sintering the dry mixture to form the cutter element.

2. The method of claim 1, wherein each of the plurality of nanocrystalline diamond particles has a size of 1 nm-10 nm.

3. The method of claim 1, wherein each of the plurality of polycrystalline diamond particles has a size of 15 µm-50 µm.

4. The method of claim 1, wherein the polar liquid is water, alcohol, glycol, or combinations thereof.

5. The method of claim 1, wherein the nanocrystalline diamond particles are doped diamond particles, undoped diamond particles, or combinations of doped and undoped diamond particles.

6. The method of claim 1, wherein the zeta potential is ±30 mV to ±40 mV.

7. The method of claim 1, wherein the zeta potential is ±41 mV to ±50 mV.

8. The method of claim 1, wherein the zeta potential is ±51 mV to ±60 mV.

9. The method of claim 1, wherein the zeta potential is ±61 mV to ±100 mV.